United States Patent [19]
Bacchi et al.

[11] 4,116,405
[45] Sep. 26, 1978

[54] AIRPLANE

[75] Inventors: Anthony C. Bacchi, Massapequa; Robert W. Kress, Lloyd Harbor, both of N.Y.

[73] Assignee: Grumman Aerospace Corporation, Bethpage, N.Y.

[21] Appl. No.: 781,691

[22] Filed: Mar. 28, 1977

[51] Int. Cl.² .................................................. B64C 15/12
[52] U.S. Cl. ............................ 244/12.4; 244/45 R; 244/55; 244/56; 244/75 R; 244/52
[58] Field of Search ............... 244/13, 12.4, 12.1, 244/15, 55, 56, 66, 65, 45 R, 45 A, 87, 91, 60, 52, 120; D12/71, 76, 77, 78, 79, 80, 52; 343/705, 708

[56] References Cited
U.S. PATENT DOCUMENTS

| | | | |
|---|---|---|---|
| D. 100,695 | 8/1936 | Harris | D12/80 |
| D. 138,795 | 9/1944 | Stoughton | 244/45 R |
| D. 175,809 | 10/1955 | Thieblot | D12/78 |
| D. 237,957 | 12/1975 | Rellis | D12/80 |
| 1,929,255 | 10/1933 | Northrop | 244/87 |
| 2,417,189 | 3/1947 | Cornelius | 244/13 |
| 2,747,816 | 5/1956 | Howard | 244/45 A |
| 2,961,189 | 11/1960 | Doak | 244/12.4 |
| 3,081,964 | 3/1963 | Quenzler | 244/56 |
| 3,167,273 | 1/1965 | Calderon | 244/12.4 |
| 3,284,027 | 11/1966 | Mesniere | 244/12.4 |
| 3,312,426 | 4/1967 | Fowler | 244/60 |
| 3,390,393 | 6/1968 | Upton | 343/708 |
| 3,524,189 | 8/1970 | Jones, Jr. | 343/705 |
| 3,544,998 | 12/1970 | Vandenplas | 343/705 |
| 3,559,926 | 2/1971 | Frehauf | 244/12.4 |
| 3,683,281 | 8/1972 | Watts, Jr. | 234/705 |
| 3,966,142 | 6/1976 | Corbett et al. | 244/12.4 |

FOREIGN PATENT DOCUMENTS

| | | | |
|---|---|---|---|
| 2,272,893 | 3/1975 | France | 244/45 A |
| 1,053,322 | 3/1959 | Fed. Rep. of Germany | 244/12.4 |

*Primary Examiner*—Galen L. Barefoot
*Attorney, Agent, or Firm*—Richard G. Geib; Mellor A. Gill

[57] ABSTRACT

An airplane having a fuselage, a high wing projecting from the upper part of the fuselage to either side first at an upward angle and then slightly downwardly whereby said wing presents a gull wing frontal contour, fins to either side and forward of and at the bottom of the fuselage with ducted fans nested to the wing under the high point of the gull wing frontal contour to be unobstructed thereby.

11 Claims, 20 Drawing Figures

AIRPLANE

BACKGROUND FOR INVENTION

As the airplane technology advances so to does the desire to make such available so that it may enjoy a wider use. In days gone by, for example, airplanes were launched and retrieved by various types of ships of the Navy fleet other than aircraft carriers. Today many such ships use helicopters as do certain non-military applications such as offshore oil rigs and other deep ocean installations. This is primarily due to a lack of an airplane that can alight and takeoff from the limited areas available at such places.

It is and has been readily recognized that inadequate range and speed limitations of helicopters make them at best a compromise with what is desired. This is to say nothing of the fact that as the work loads increase the helicopter size grows to where, even now, in some roles one must hover to take on and discharge loads. Furthermore, the complexities of helicopter construction and control lead to maintenance requirements that are burdensome economically.

It was no doubt with a recognition of a need to bring back fixed wing aircraft to these roles that many prior inventors toiled with limited success.

There was as many may recall the efforts by major airplane manufacturers to suggest that "tail-sitters" or "tilt-wings" may be solutions to the problems of finding a practical vertical takeoff and landing (VTOL) airplane having high speed and range performance of a fixed wing airplane. Neither of these approaches to a VTOL had more than a success in the media, i.e. they have not proven to be the practical design needed by either the military or commercial enterprises to justify adherence to other than the compromise of the helicopter operation.

It has been of particular note that in France in 1955 it was suggested one might employ rotatable powerplants on wings of a conventional airplane having conventional tail and wing controls to obtain a short takeoff and landing (STOL) airplane. This is shown by U.S. Pat. No. 2,971,725. Seven years later in 1962 Professor Calderon of Peru suggested that one may dispense with conventional tail pitch and yaw control surfaces by using a movable surface behind ducted fan means that pivot between a horizontal attitude to a vertical attitude out at the wing tips. This was disclosed to the public in U.S. Pat. No. 3,167,273. Next it was suggested in Germany in 1966 that one could take jet engines, two on each side, one of which was ahead and under and the other projecting above and behind a wing, and rotate same about an axis so that their thrust axis in the vertical position was equidistantly adjacent the airplane center of gravity point in the fuselage. This was disclosed by U.S. Pat. No. 3,469,803.

Presently the only known VTOL in use in the world is the British Harrier used by the United States Marine Corp. This airplane has jet propulsion means with a plurality of exhaust nozzles to either side of the airplane's fuselage. These nozzles rotate so as to provide horizontal and vertical thrust for the airplane. Therefore, one can fly the Harrier as a fixed wing airplane and operate in a VTOL mode as well.

With the exception of the disclosure by the assignee of this invention of a tail-sitter type airplane, for lack of a better self-coined label, shown by U.S. Pat. No. 3,966,142 this pretty much was and is the VTOL background for this invention. As for the airplane that is shown by assignee's patent aforesaid, there a propulsion means to either side of a fuselage, as by side pylons or podded wing units, is arranged to wash the empennage of the airplane to maximize control moments from rudder and elevator movements.

SUMMARY

It is therefore the principal object of this invention to add to the knowledge of those skilled in the art the following disclosure of a unique vertical takeoff and landing airplane useable with or without a launch and recovery apparatus which concept underlying all this is even of wider utility in that it is equally suitable for and intended to include both manned and remotely piloted vehicles.

Actually the VTOL airplane concept herein disclosed is for a fixed wing, conventionally arranged vehicle powered by ducted fan means adapting the advantages of assignee's earlier patented VTOL aforementioned to a more conventional form of airplane design. This will make the transition for the operator/controller from standard airplanes to this VTOL less of a training or qualification problem. With this in mind it is a specific object of these Letters Patent to disclose both a new and novel airplane design and one that also is operable in a VTOL mode as required.

DRAWING DESCRIPTION

Figure 3:
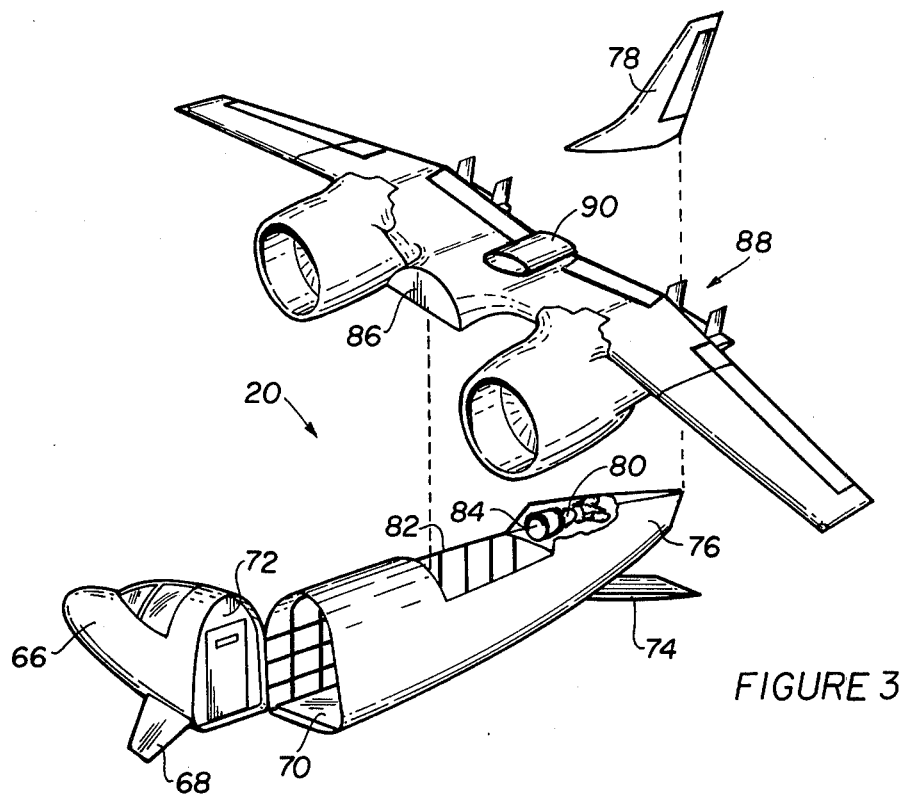
FIG. 3 is an isometric view of the airplane of FIG. 1 showing the major subassemblies thereof in a representative exploded view.
Figure 5A:
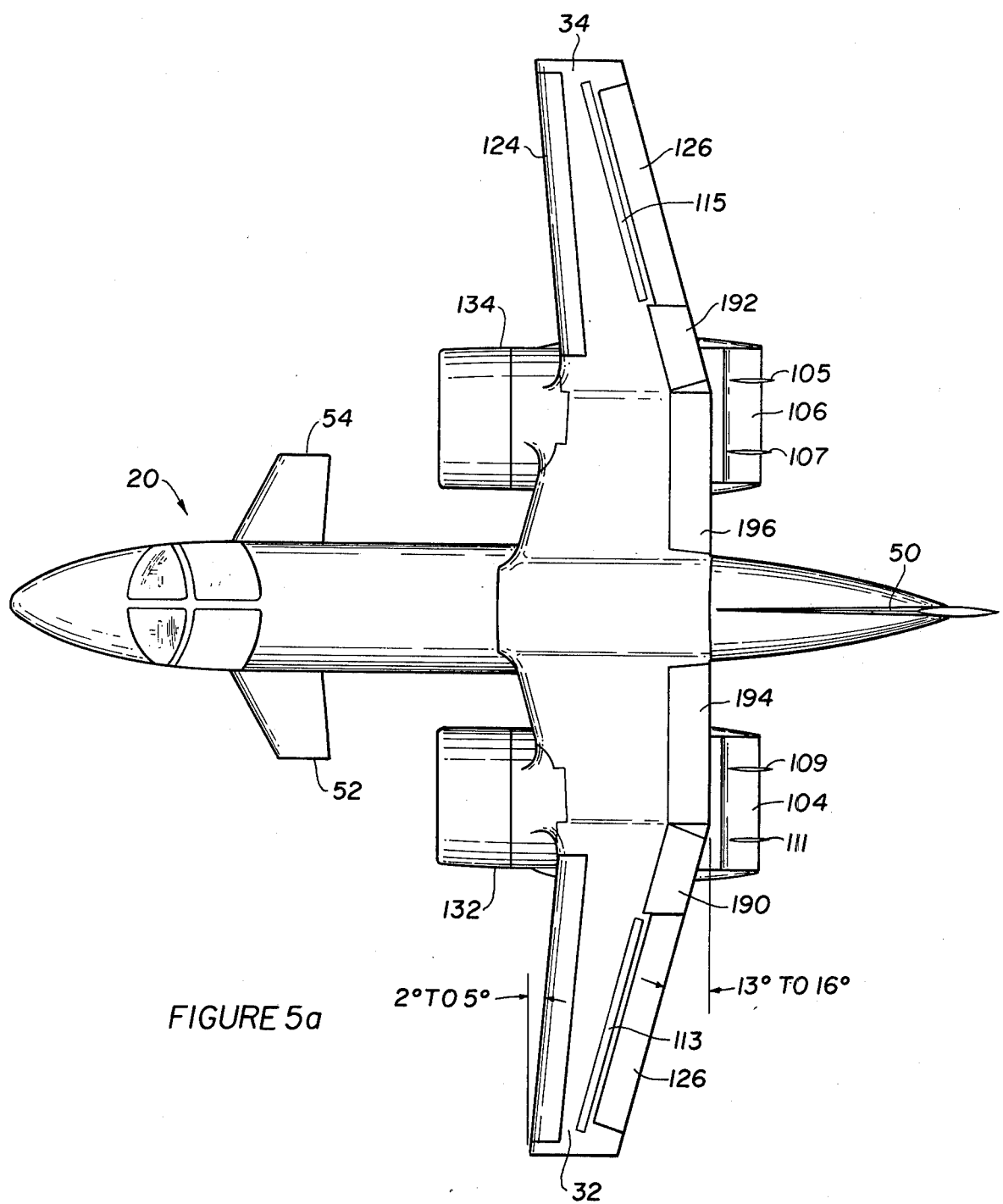
Figure 6:
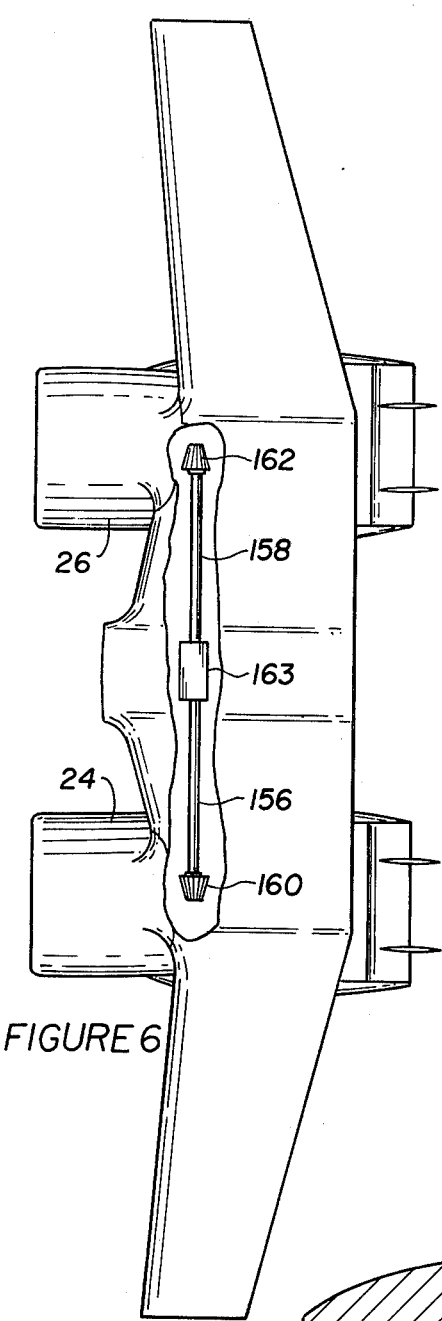
Figure 6A:
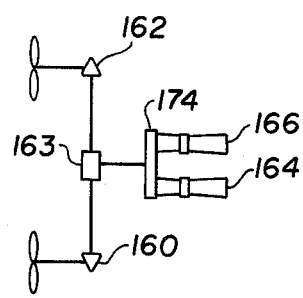
Figure 6B:
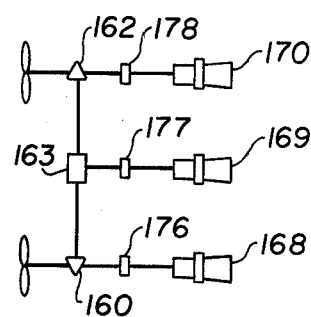
Figure 8:
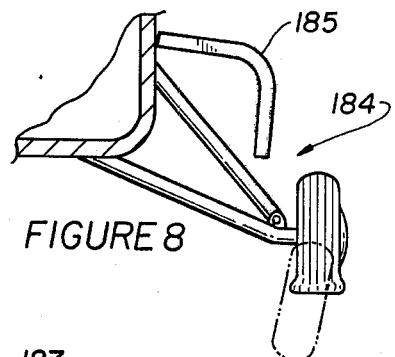
Figure 9:
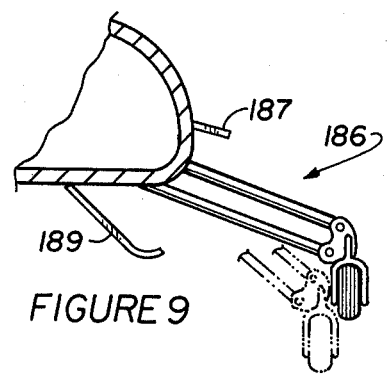
Figure 7:
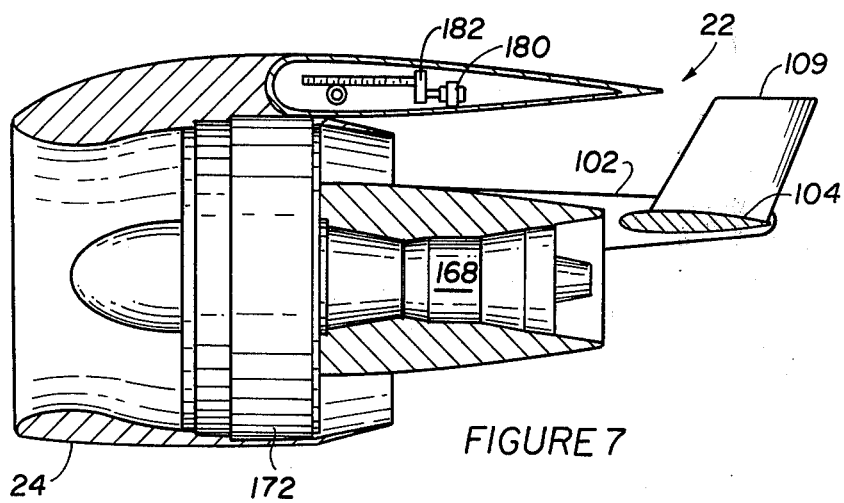
Figure 10A:
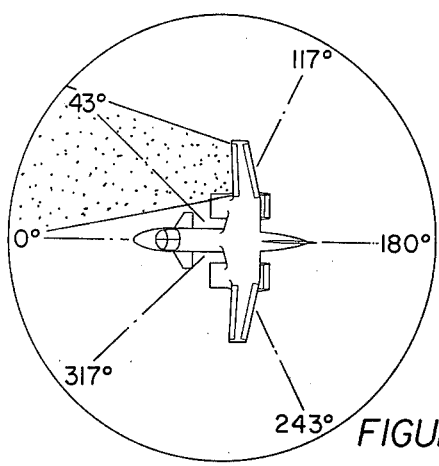
Figure 10D:
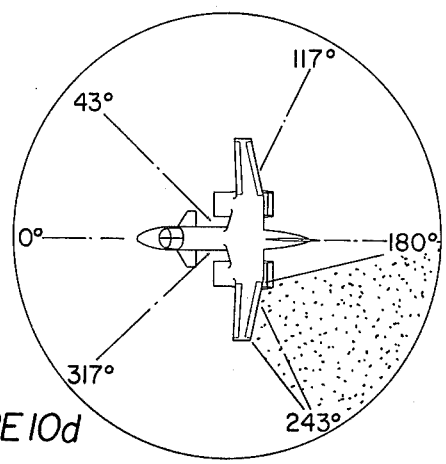
Figure 10B:
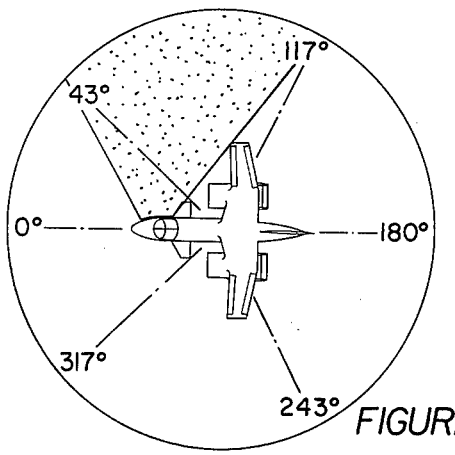
Figure 10E:
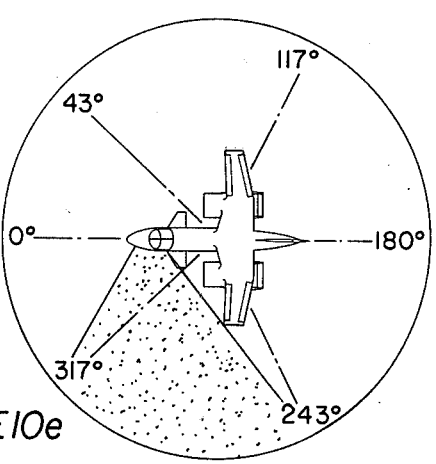
Figure 10C:
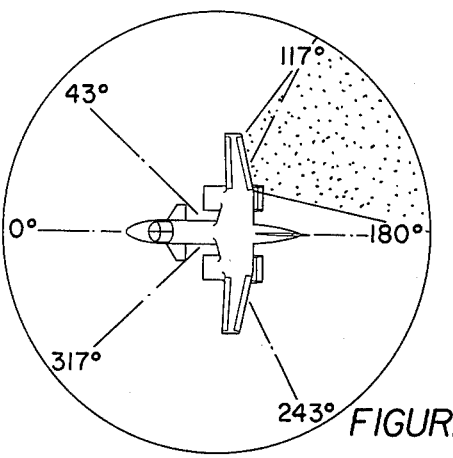
Figure 10F:
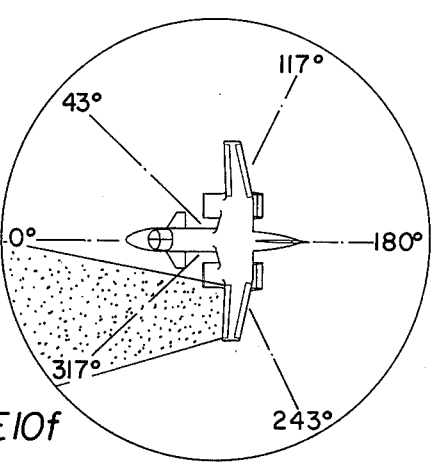
Figure 10G:
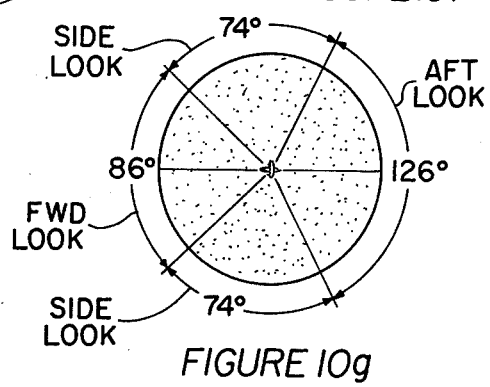

FIGS. 5a, b and c are plan, side and frontal views of the airplane designed according to this invention;

FIG. 6 is a plan view of a wing subassembly as shown in FIG. 3 with a portion of its upper surface broken away to show a shafting connection between propulsion means;

FIGS. 6a and 6b are schematics of various propulsion means and drives possible of use with this invention;

FIG. 7 is a cross-sectional view of a fan jet propulsion means for the airplane of this invention;

FIG. 8 is a broken frontal view of the fuselage of an airplane according to this invention to show the main landing gear form;

FIG. 9 is another broken cross-sectional view of the fuselage of an airplane showing the nose landing gear form; and FIGS. 10a, b, c, d, e, f and g are illustrations of the radar scan sequence and the whole scan possible with the airplane of this invention.

DETAILED DESCRIPTION

Figure 1:
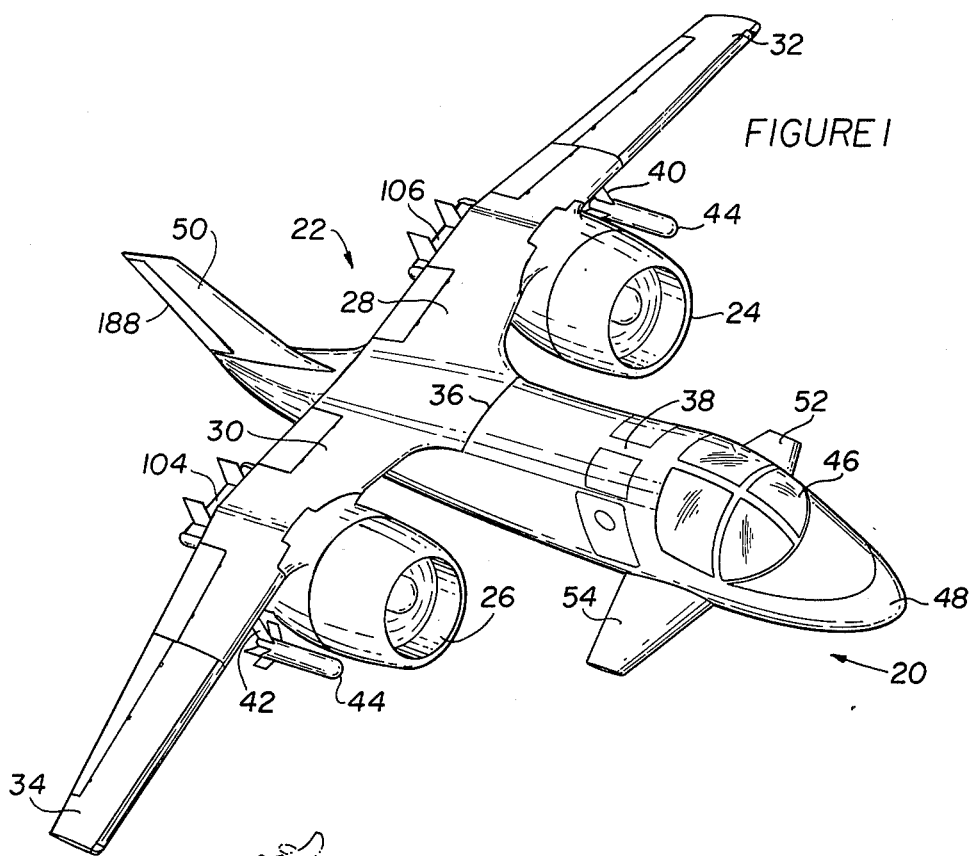
FIG. 1 is an isometric drawing of an airplane designed according to this invention.

The VTOL airplane 20 of FIG. 1 has a fixed wing 22 supporting ducted fans 24 and 26 at the juncture of upwardly inclined root sections 28 and 30 with downwardly inclined and swept forward tip sections 32 and 34. The wing 22 has a central section 36 which is faired to and mounted within a well of a fuselage 38. Wing 22 also has pylons 40 and 42 for external support of fuel tanks, weaponry and/or cargo pods 44.

Fuselage 38 shown in FIG. 1 in contrast to that of FIG. 3 is of a passenger or utility type. It, of course, has the usual pilots compartment 46 behind a nose section 48, and a vertical tail 50 which may include a rudder is faired to the aft portion of the fuselage. A pair of dihedrally arranged fins 52 and 54 that may be fixed or controllably rotatable project from opposite sides of the fuselage. Their location with the aft location of wing 22 is such that the point of the center of gravity of the airplane is between wing and fins.

Before further describing other inventive attributes of this airplane an example of its utility is to be described with reference to FIG. 2.

There a vessel such as an oceanographic research ship 60 is depicted having its helicopter landing pad 62 adjacent a hanger provisioning 64 on the aft structure. The airplane 20 of FIG. 1 is shown to be approaching the pad 62 with its propulsion means, i.e. ducted fans 24 and 26, rotated to a vertical position. In such attitude this propulsion means will, as will be described in greater detail below, allow the airplane 20 to operate in a VTOL mode in contrast to the conventional flight mode of operation to be visualized from FIG. 1.

With reference now to FIG. 3 it can be seen that the airplane 20 is now projected as a cargo plane having an optional hinged nose section 66 which carries the dihedrally disposed fin means, fin 68 only being shown for the port side. Nose section 66 is shown opened to expose the cargo flooring 70 which extends from cockpit area 72 to an aft ramp door 74 opening under the tail 76 to which vertical fin 78 is attached.

In this particular aircraft of FIG. 3, a jet propulsion means 80, such as a turboshaft engine, is located in an aft fuselage compartment adjacent a wing well 82 so that its inlet 84 and drive shafting (not shown) will mate with provisions of center section 86 of a gull-wing 88, i.e. over the wing air inlet 90 of this embodiment will feed inlet 84 of the engine when wing 88 is affixed in well 82.

Figure 2:
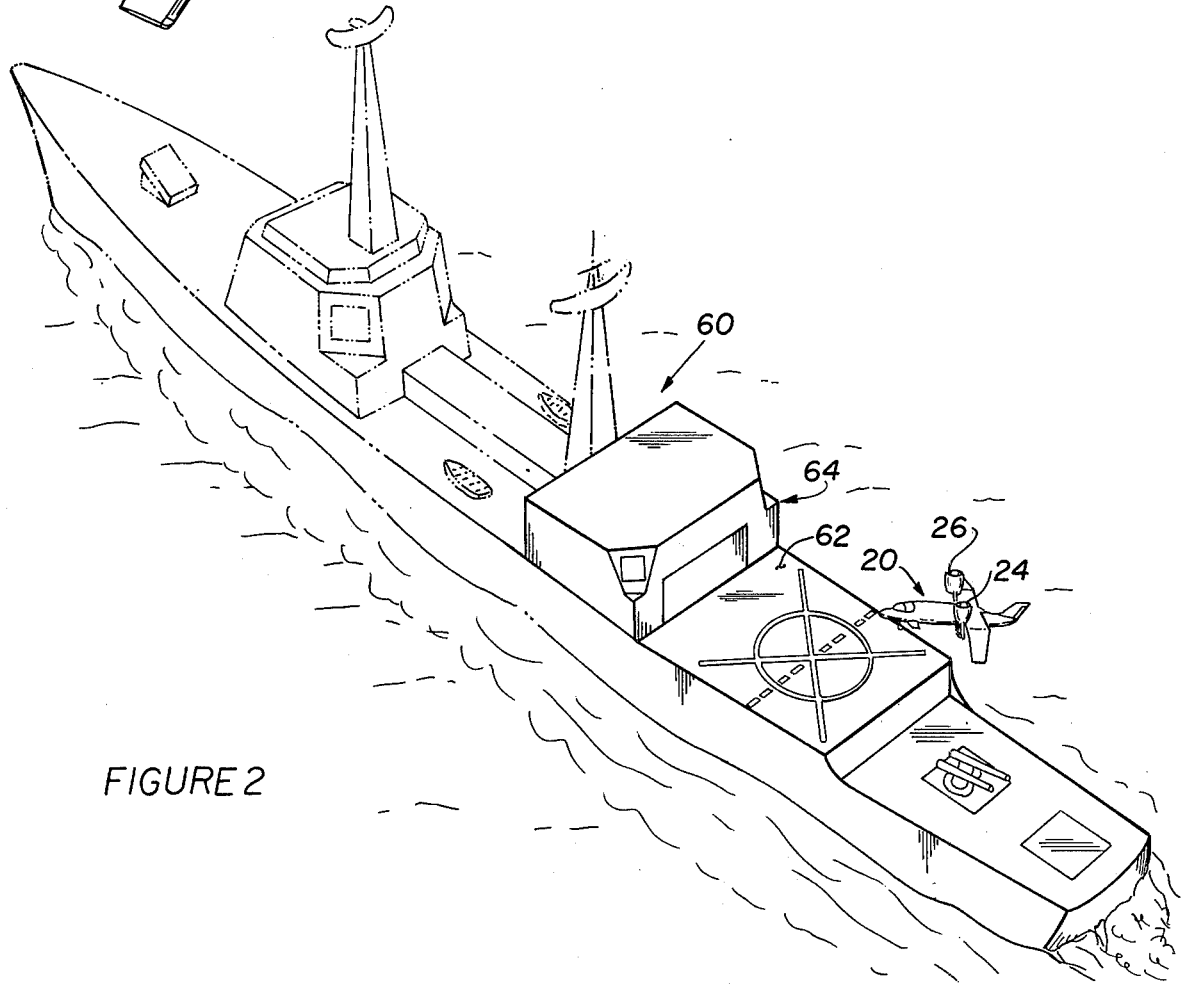
FIG. 2 is an isometric drawing of a vessel at sea with an airplane landing thereon to illustrate utility of this invention.
Figure 4:
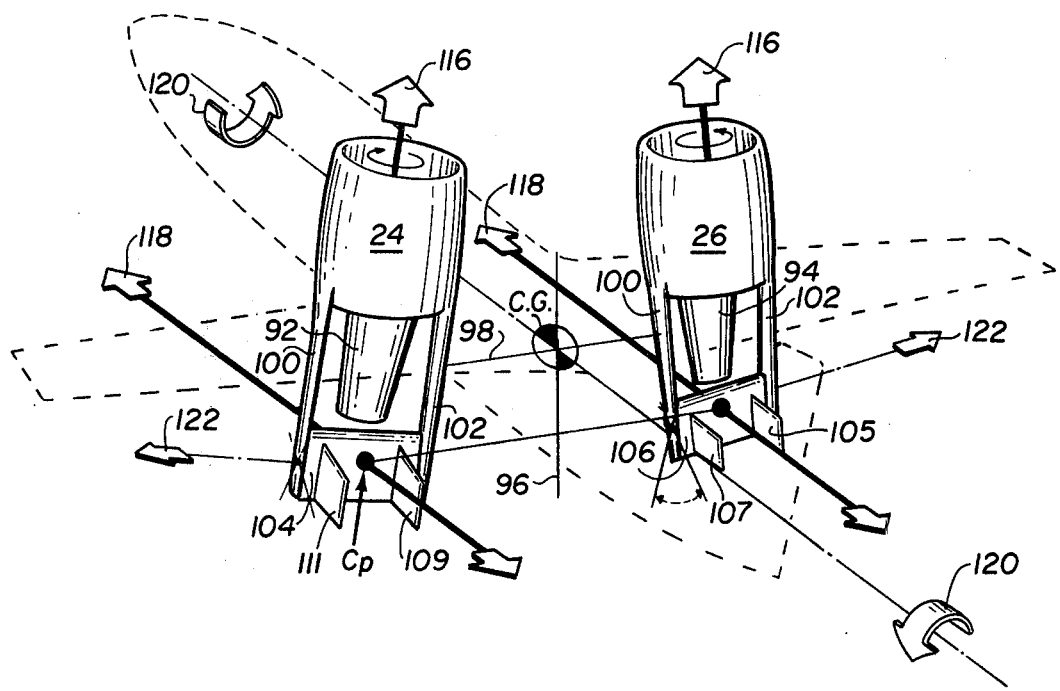
FIG. 4 is an isometric illustration of control features afforded by the propulsion means of this invention in a vertical attitude.

With reference now to FIG. 4 the purpose is to there, with the use of arrows, explain control forces to be derived in the VTOL mode of operation of the airplane, partially outlined in phantom, as shown in FIG. 2. In this figure the propulsion means in the form of port and starboard fan jets, to be more particularly described in reference to FIG. 7, 92 and 94, respectively are shown in their vertical position where their axes are in a plane, represented by crossed lines 96 and 98 through the center of gravity (c. g.) of the airplane. These propulsion means are provided with trailing booms 100 and 102 on each to rotatably mount control surfaces 104 and 106. Pivotally mounted on surfaces 104 and 106 are other movable control surfaces 105, 107 and 109, 111. Actually in the embodiment of this invention flown each surface 104 and 106 and its two pivotable rudders 105, 107 and 109, were independently controllable. With this arrangement the fan jets 92 and 94 can provide lift forces 116 and surfaces 104, 106, 105, 107, 109 and 111 being in the efflux of these fan jets can provide pitch, roll and yaw forces 118, 120 and 122, respectively, for the airplane. If desired control surfaces 104 and 106 without surfaces 105, 107, 109 and 111 could by collective or differential movement be singly used for pitch and yaw and variable fan pitch control or other variable thrust control between ducted fans or fan jets 92, 94 could control roll while regulating lift therewith, i.e. symmetrical development of moments 118 will produce pitch forces and unsymmetrical moments give yaw forces. A tabular presentation of means to obtain such control forces in various embodiments of this invention may be shown by the tabular presentation that follows.

| Type Control Force | AIRPLANE OPERATIONAL MODE | |
|---|---|---|
| | CONVENTIONAL | VTOL |
| Pitch (118) | 1) Surfaces 104, 106 are symmetrically operated; and/or<br>2) Surfaces 52, 54 are symmetrically operated. | 1) Surfaces 104, 106 are symmetrically operated |
| Yaw (122) | 1) Surfaces 105, 107 and 109, 111 are symmetrically controlled; and/or<br>2) Rudder 188 is controlled. | (1) Surfaces 104, 106 are differentially controlled |
| Roll (120) | 1) Surfaces 104, 106 are differentially controlled; and/or<br>2) Spoilers 113 and 115 are differentially controlled; and/or<br>3) Ailerons 190 and 192 are differentially controlled. | 1) Surfaces 105, 107 and 109, 111 are symmetrically controlled; and/or<br>2) (a) Fan Pitch of propulsion means 24 and 26; (b) Inlet guide vanes of propulsion means 24 and 26; and/or (c) power management of propulsion means 24 and 26 are differentially controlled |

It will be readily appreciated that apparatus to provide such control forces are within the skill of the art and that it is conceivable that such will be used also in the conventional flight mode to operate elevons 52 and 54, ailerons 190 and 192 and rudder 188 with surfaces 104, 106 plus others, if desired, to supplement control forces of these more conventional control means. As seen in FIG. 5(a) the wings may also be provided with spoiler surfaces 113 and 115 for conventional control in adjunct or separate of ailerons 190, 192.

Figure 5B:
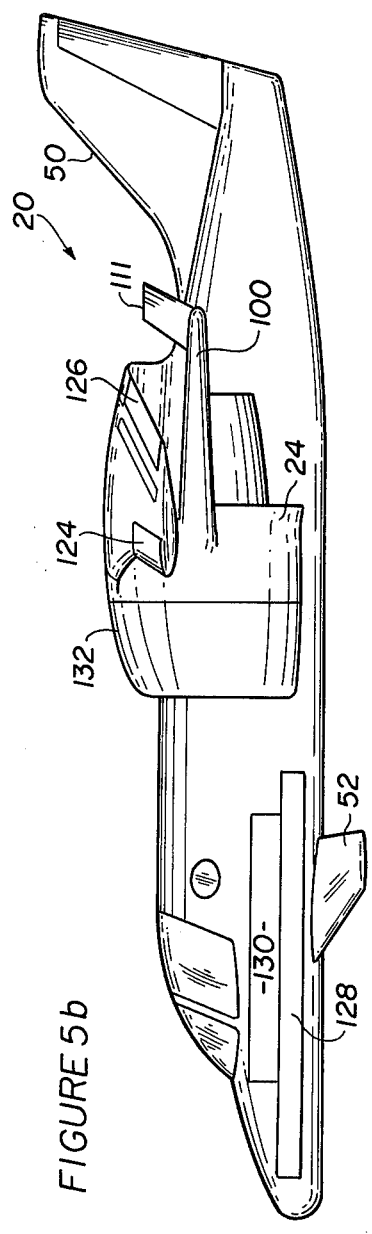

In comparing FIGS. 5(a) (b) and (c) one will readily appreciate the fact that it further includes leading and trailing edge endfire yagi surveillance radar arrays 124 and 126 on each forwardly swept downwardly inclined wing tips 32 and 34. In addition the fuselage is provided with cavity backed slotted surveillance radar arrays 128 and 130 (See FIG. 5b) on each side adjacent the nose. With such an antenna system one can have forward, aft and side looking radar apparatus such that the airplane can function as a picket airplane without the usual rotodome, a savings of some 4800 lbs. reasonably predictable in radar apparatus or some 16,800 lbs. savings in airplane gross weight to say nothing of improved aerodynamic considerations such affords. For such a system the cowl sections 132 and 134 are constructed of a nonmetallic radar passive material as are the fins 52 and 54.

Antenna arrays such as are contemplated for use in this airplane as above are described in patent application ser. No. 618,401 filed Oct. 1, 1975, now abandoned and assigned to the common assignee herewith.

Whereas each array in free space is capable of ± 45° scan, practical aircraft structural elements would normally inhibit the full scan operation of one or more arrays. As a consequence, array locations and aircraft structure must be viewed as an interactive design problem to assure 360° coverage.

In one embodiment of the airplane constructed the wing tips 32 and 34 had a 5° forward sweep at the leading edge and a 16° forward sweep of the trailing edge. This forward sweep could range between 2° – 5° for leading edge and 13° to 16° for trailing edge sweep. As seen in the frontal view the wing is designed so as to have a positive dihedral of 7° from horizontal in root sections 28 and 30 and a 7° negative dihedral again from horizontal for tips 32 and 34 (See FIG. 5c in a re root 30 and tip 34).

With this design of the wing plus the use of slotted side looking arrays it is possible to electronically scan 360°. Specifically the scanning sequence starts with the leading edge array 124 for the starboard tip 34 scanning from the 0° azimuth to the 43° azimuth. Next starboard side looking array will scan from 43° azimuth to 117° azimuth whereupon starboard trailing edge array will scan from 117° azimuth to 180° azimuth, and port trailing edge antenna scans from the 180° azimuth through 243° azimuth.

At this point port side looking array 126 scans from the 243° azimuth through the 317° azimuth. Port leading edge yagi will next become operative to complete the scan from 317° azimuth to 360° or 0°. Such 360° scan is only possible because of the structural design that allows the trailing edge yagi's to cover areas that the side looking arrays cannot because of structural interference. This would not be possible without the forward sweep of the trailing edges of tips 34 and 32. As a result it is possible with this invention to realize how one may compatibly incorporate radar arrays in airplane structures such that the arrays do not add aerodynamic problems to the airplane and the airplane does not interfere with radar operation. This scanning sequence is illustrated by FIGS. 10a, b, c, d, e and f.

Figure 5C:
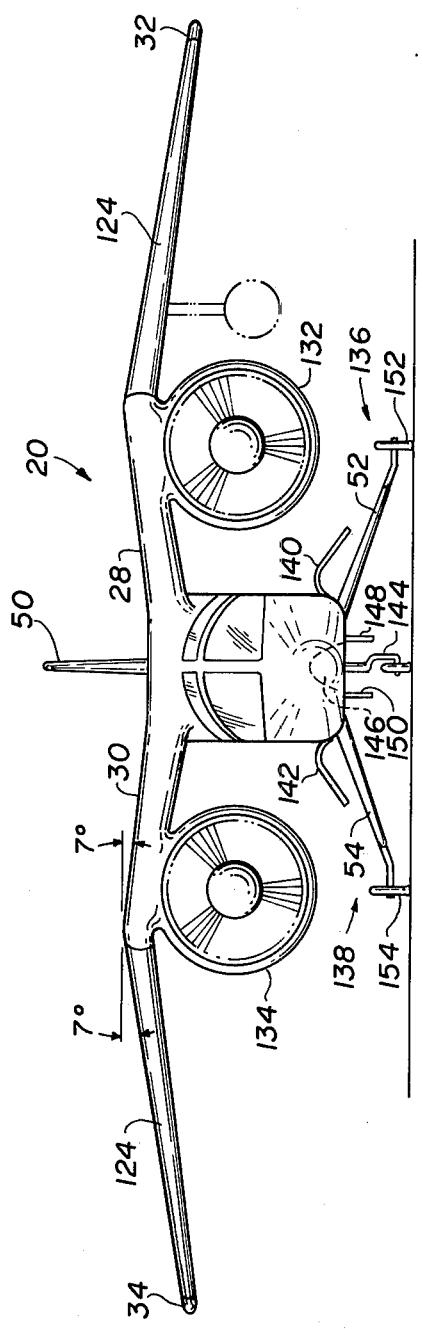

With further reference to FIG. 5c there is shown a typical tricycle landing gear for airplane 20 including wide track main gears 136 and 138 retractable into wheel wells of the fuselage behind doors 140 and 142 and nose gear 144 retractable into a wheel well 146 behind doors 148 and 150. The gears 136 and 138 are separated a distance such that wheels 152 and 154 thereof underly the horizontal and consequently are near the vertical centerline of the propulsion means 24 and 26. If a narrower track is desired then the four wheel gear to be described with reference to FIGS. 8 and 9 could be used.

With reference now to FIGS. 6, 6a, 6b and 7 it is desired to further describe the propulsion means. As seen in FIG. 6 two ducted fan units are synchronized by shafts 156 and 158 from gear means 160 and 162 driven by the fan means in a conventional manner. A gear box or coupling means 163 is located in the wing center box structure to permit the shafts 156 and 158 to be joined thereat and more importantly to eliminate angular misalignment problems caused by the wing contour in which the shaft supports (not shown) are adapted. This drive means of FIG. 6 is readily adaptable to be connected to varying fuselage mounted propulsion means [See turboprop engines 164 and 166 of FIG. 6a or as a drive synchronizing link between fan jet engines 168, 169 and 170 in the nacelles 172 (See FIG. 7)].

In FIG. 6a the turboshaft engines are connected to a gear box 174 within which, as will be readily familiar to one skilled in the art, there will be mechanisms to permit only the operating turboshaft to drive the coupling means 163. In another form as shown in FIG. 6b one may use fan jets 168, 169 and 170 connected through drive disconnects, such as overrunning clutches 176, 177 and 178, to gear means 160, 162 and 163. Therefore, should anything happen to one powerplant drive train the fan means within the propulsion means 24 and 26 will be driven by the working powerplant. If desired, and again in order to insure a drive thereof, the center gear box or coupling means 163 can be adapted as an accessory drive gear box.

With more particular reference to FIG. 7 there is shown a motor 180 driving a rack and pinion gear means 182 to permit the propulsion means to rotate from the horizontal position shown under wing 22 adjacent juncture of root 28 and tip 32 to the vertical position shown in FIG. 4. Due to the fact that the engines are pivoted to the wing roots having a positive dihedral of 7° their thrust axis will converge toward a point in space within the plane of the airplane's c. g. This will have the effect of spreading the area wetted by the efflux of the ducted fans in such vertical attitude providing a broader footprint when in the ground effect mode to increase airplane stability for liftoff and touch down in the VTOL mode of airplane operation.

FIGS. 8 and 9 conclude the descriptive matter of this invention showing a quad gear having two resiliently suspended and retractable main gear means 184 (one being shown by FIG. 8) and two resiliently suspended and retractable nose gear means 186 (one being shown by FIG. 9). Such a landing gear will allow a narrower tread for the main gear over that of shown therefor in a tricycle arrangement of FIG. 5(c) in that there is fore and aft lateral wheel separation to absorb roll moments when propulsion means 24 and 26 are in their vertical attitude (See FIG. 4). This quad-gear, as it may be termed is retractable within the fuselage behind main gear doors 185 and nose gear doors 187 and 189 by means readily familiar to one skilled in the art.

As referenced above, the fins 52 and 54 and a rudder 188 on vertical fin 50 may be pivotally mounted to be controllable by a pilot as in conventional airplanes for pitch and yaw control of airplane 20. In this mode the surfaces 104 and 106 may be differentially controlled for roll control of the airplane. As seen by FIG. 5a, roll control may also be by ailerons 190 and 192 in the wing with or without surfaces 104 and 106. Completing the control surface description are the flap surfaces 194 and 196 operable in a conventional landing and takeoff operation of airplane 20.

As will be only appreciated from a reading hereof this invention contemplates not only conventional airplane control and thrust vector airplane control but also combinations thereof of infinite varieties. This is more particularly practical today with redundant fly by-wire control systems as are within the realm of adaptation hereto by one skilled in the art.

Having described a structural embodiment of this invention, the claims for these Letters Patent are:

1. An airplane having a fuselage, a high wing mounted from the upper part of the fuselage, said wing having a center section for root sections projecting at an upward angle to which are joined tip sections projecting slightly downwardly from a juncture with said root sections whereby said wing presents a gull-wing frontal contour, to either side of said center section, a vertical airfoil means aft and negative dihedral fin means forward projecting laterally from each side of the fuselage at the bottom thereof, said airplane comprising:
   propulsion means adjacent the juncture on each side of the fuselage to be nested by the undersurface the wing, said propulsion means having an air inlet ahead of the wing and above the fin means to be unobstructed by airflow about either;
   controllable surfaces operatively arranged behind and integral with said propulsion means to use the thrust of said propulsion means to provide control moments about said controllable surfaces for airplane control;
   pivoting means connecting said propulsion means to said wing to rotate same from a horizontal nested position under the wing to a vertical position where a thrust axis of the propulsion means is in a plane through a center of gravity location of the airplane while being at an angle to intersect said plane above the fuselage.

2. The airplane of claim 1 and further characterized by said fuselage having a wing well within which is mounted said center section between the root sections said center section connecting said wing to the fuselage in said wing well.

3. The airplane of claim 1 wherein said propulsion means are ducted fan propulsion means that are further characterized as being linked to each other ducted fan propulsion means so that the drive of anyone may be the drive for all.

4. The airplane of claim 2 wherein said propulsion means are ducted fan propulsion means that are further characterized as being linked to each other ducted fan propulsion means so that the drive of anyone may be the drive for all.

5. The airplane of claim 1 and further characterized by radar antenna means in the fuselage and the edges of the wings to provide a 360° scan.

6. An airplane comprising:
   a fuselage having aft vertical rudder means and controllable stabilizers on each side of a forward portion of the fuselage at a downwardly inclined angle therewith, said fuselage being provided with a wing well on its uppermost surface to the rear of the normal center of gravity for said fuselage;
   a wing having a gull-wing contour to either side of a central section, said central section being mounted in said wing well to said fuselage, said wing also having a sweep forward profile as to wing tips thereof from a point of change from upward angle to downward angle of said gull-wing contour; and
   ducted fans nested under each said wing at said point such that said gull-wing forms a faired support for said propulsion means, said ducted fans having an air inlet ahead of the wings and due to the inclined angle above the controllable stabilizers on each side of the fuselage so as to be unobstructed by air flow over either said wing or said controllable stabilizers, said ducted fans being pivotally affixed to the wing at said point so as to be rotatable from horizontal attitude under the wing to a vertical attitude in front of the wing with an axis of each said ducted fans being in a plane of the center of gravity for said airplane in the vertical attitude of the propulsion means, said ducted fans also having support means extending aft thereof, said support means mounting movable control surface means to control forces in both the horizontal attitude and the vertical attitude.

7. The airplane of claim 6 wherein the support means are each trailing boom means supporting an elevator control surface in turn supporting a rudder control surface in the efflux of the ducted fans therewith associated.

8. An airplane comprising:
   a fuselage;
   a wing for said fuselage, said wing being of a gull-wing contour having a center section projecting normal to the fuselage joined on each side to swept forward-tips, said wing being mounted in a wing well at the top of said fuselage;
   propulsion means mounted under said wing so as to underlie said wing at the high point of the gull-wing contour to be within the fuselage profile;
   stabilizer fins for said fuselage, said stabilizer fins being pivotally supported from the bottom of and to each side of said fuselage ahead of and under said propulsion means; and
   vertical fin means haivng a rudder at the tail of said fuselage.

9. The airplane of claim 8 and further comprising radar antenna means on opposite sides of said fuselage in the area above said fins and in the leading edge and trailing edge of said swept forward tips.

10. An airplane comprising:
    a fuselage having aft vertical rudder means and controllable stabilizers on each side of a forward portion of the fuselage at a downwardly inclined angle therwith, said fuselage being provided with a wing well on its uppermost surface to the rear of the normal center of gravity for said fuselage, said fuselage being provided on each side with a slotted array antenna;
    a wing having a gull-wing contour to either side of a central section, and centeral section being mounted in a said wing well to said fuselage and extending normal to said fuselage, said wing also having a sweep forward profile as to wing tips thereof from a point of change from upward angle to downward angle of said gull-wing contour, said wing tips having leading and trailing edges;
    yagi arrays in said leading and trailing edges in each of said wing tips to provide with said slotted array antennas on each side of the fuselage a 360° radar scan from the airplane in sequential operation; and
    propulsion means nested under each said wing at said point such that said gull-wing forms a faired support for said propulsion means, said propulsion means having an air inlet ahead of said wings and due to the inclined angle above the controllable stabilizers on each side of the fuselage so as to be unobstructed by air flow over either said wing or said controllable stabilizers.

11. An airplane comprising:

a fuselage;

a symmetrical gull contour wing supported by a fuselage wing well at the top of said fuselage;

stabilizer fins projecting downwardly away from said fuselage at the bottom thereof and ahead of the wing well;

propulsion means pivotally supported by said wing at high points of the gull contour which points are above the fuselage on opposite sides thereof, said propulsion means having an inlet means, when said propulsion means are horizontal they are parallel to the fuselage and said inlet means are in a plane normal to the fuselage, ahead of the wing and aft and above the juncture of the stabilizer fins with the fuselage, such that air flow about the fins and over the wings will not affect air flow to the inlet means, i.e. block any portion thereof, when said propulsion means are in a vertical attitude, said inlet means are in a horizontal plane above the airplane, said propulsion means axes in said vertical attitude being at an angle to the vertical to intersect with a plane through the fuselage longitudinal axis and with each other above the fuselage, said stabilizer fins being pivotal with respect to the fuselage to provide control forces for the airplane;

control surface means pivotally mounted to boom structures mounted to the propulsion means such that said control surface means are operatively arranged to provide control forces for the airplane from the efflux of the propulsion means; and vertical fin means at the tail of said fuselage behind said wing well, said vertical fin means at the tail of said fuselage behind said wing well, said vertical fin means having a rudder pivotally carried thereby to provide control forces for said airplane.

* * * * *